United States Patent
Cordara et al.

(10) Patent No.: US 10,096,116 B2
(45) Date of Patent: Oct. 9, 2018

(54) METHOD AND APPARATUS FOR SEGMENTATION OF 3D IMAGE DATA

(71) Applicant: Huawei Technologies Co., Ltd., Shenzhen (CN)

(72) Inventors: Giovanni Cordara, Munich (DE); Imed Bouazizi, Munich (DE); Lukasz Kondrad, Munich (DE)

(73) Assignee: Huawei Technologies Co., Ltd., Shenzhen (CN)

(*) Notice: Subject to any disclaimer, the term of this patent is extended or adjusted under 35 U.S.C. 154(b) by 197 days.

(21) Appl. No.: 14/766,687

(22) PCT Filed: Dec. 12, 2012

(86) PCT No.: PCT/EP2012/075283
§ 371 (c)(1),
(2) Date: Aug. 7, 2015

(87) PCT Pub. No.: WO2014/090303
PCT Pub. Date: Jun. 19, 2014

(65) Prior Publication Data
US 2016/0005181 A1    Jan. 7, 2016

(51) Int. Cl.
*G06K 9/00* (2006.01)
*G06T 7/00* (2017.01)
(Continued)

(52) U.S. Cl.
CPC .............. *G06T 7/0081* (2013.01); *G06T 7/11* (2017.01); *H04N 13/0022* (2013.01);
(Continued)

(58) Field of Classification Search
None
See application file for complete search history.

(56) References Cited

U.S. PATENT DOCUMENTS

| 5,128,874 A | 7/1992 | Bhanu et al. |
| 5,845,006 A | 12/1998 | Sumi et al. |

(Continued)

FOREIGN PATENT DOCUMENTS

| CN | 101815225 A | 8/2010 |
| CN | 101819679 A | 9/2010 |

(Continued)

OTHER PUBLICATIONS

Felzenszwalb et al., "Efficient Graph-Based Image Segmentation," International Journal of Computer Vision, vol. 59, Issue 2, pp. 167-181, Kluwer Academic Publishers, Hingham, Massachusetts (Sep. 2004).

(Continued)

*Primary Examiner* — Fred Hu
(74) *Attorney, Agent, or Firm* — Leydig, Voit & Mayer, Ltd.

(57) ABSTRACT

The present invention provides a method and an apparatus for real time object segmentation of 3D image data based on local feature correspondences between a plurality of views. In order to reduce the computational effort of object segmentation of 3D image data, the segmentation process is performed based on correspondences relating to local features of the image data and a depth map. In this way, computational effort can be significantly reduced and the image segmentation can be carried out very fast.

17 Claims, 6 Drawing Sheets

(51) Int. Cl.
  *H04N 13/128* (2018.01)
  *H04N 13/00* (2018.01)
  *G06T 7/11* (2017.01)

(52) U.S. Cl.
  CPC . *H04N 13/128* (2018.05); *G06T 2207/10012* (2013.01); *G06T 2207/10028* (2013.01); *H04N 2013/0081* (2013.01)

(56) References Cited

U.S. PATENT DOCUMENTS

| | | | |
|---|---|---|---|
| 6,055,330 A * | 4/2000 | Eleftheriadis | G06T 9/007 382/154 |
| 2003/0048849 A1 | 3/2003 | Tomita et al. | |
| 2005/0195185 A1 | 9/2005 | Slabaugh et al. | |
| 2007/0247522 A1 * | 10/2007 | Holliman | H04N 13/0003 348/46 |
| 2008/0137989 A1 | 6/2008 | Ng et al. | |
| 2010/0111417 A1 * | 5/2010 | Ward | H04N 13/026 382/173 |
| 2011/0032341 A1 | 2/2011 | Ignatov et al. | |
| 2011/0080466 A1 | 4/2011 | Kask et al. | |
| 2012/0140038 A1 * | 6/2012 | Bi | H04N 13/0022 348/46 |
| 2012/0320153 A1 | 12/2012 | Barcons-Palau et al. | |
| 2016/0012283 A1 * | 1/2016 | Mitoma | B60R 1/00 382/103 |

FOREIGN PATENT DOCUMENTS

| | | | | |
|---|---|---|---|---|
| CN | 102750711 A | 10/2012 | | |
| CN | 102812711 A | 12/2012 | | |
| CN | 101815225 B | 7/2014 | | |
| JP | 2005157910 A | 6/2005 | | |
| JP | WO 2014132729 A1 * | 9/2014 | | B60R 1/00 |
| WO | WO 9815915 A1 | 4/1998 | | |
| WO | WO 2005060271 A1 | 6/2005 | | |

OTHER PUBLICATIONS

Lowe, "Distinctive Image Features from Scale-Invariant Keypoints," Journal of Computer Vision, vol. 60, Issue 2, pp. 91-110, Kluwer Academic Publishers, Hingham, Massachusetts (Nov. 2004).
Bay et al., "SURF: Speeded Up Robust Features," Journal of Computer Vision and Image Understanding, vol. 110, Issue 3, pp. 346-359, Elsevier Science Inc., New York, New York (Jun. 2008).
Fischler et al., "Random Sample Consensus: A Paradigm for Model Fitting with Applications to Image Analysis and Automated Cartography," Communications of the ACM, vol. 24, Issue 6, pp. 381-395, ACM, New York, New York (Jun. 1981).
Lepsoy et al., "Statistical Modelling of Outliers for Fast Visual Search," IEEE International Conference on Multimedia and Expo (ICME), pp. 1-6, Institute of Electrical and Electronics Engineers, Valbonne, France (Jul. 11-15, 2011).
Parker, "Kinect Depth Based Video Segmentation," (Published after Jun. 2011).
Bleiweiss et al., "Fusing Time-of-Flight Depth and Color for Real-Time Segmentation and Tracking," Proceedings of the DAGM Workshop on Dynamic 3D Imaging, pp. 58-69, Springer Verlag, Berlin, Germany (2009).
Lang et al., "Nonlinear Disparity Mapping for Stereoscopic 3D," ACM Transactions on Graphics (TOG), vol. 29, Issue 4, ACM, New York, New York (Jul. 2010).
O'Regan et al, "Implicit Spatial Inference with Sparse Local Features," International Conference on Image Counseling, pp. 2388-2391, Institute of Electrical and Electronics Engineers, New York, New York, (Oct. 12-15, 2008).
Silberman et al, "Indoor Scene Segmentation using a Structured Light Sensor," International Conference on Computer Vision Workshops, pp. 1-608, Institute of Electrical and Electronics Engineers, New York, New York, (Nov. 6-13, 2011).
Schiopu et al, "Lossy and Near-Lossless Compression of Depth Images Using Segmentation into Constrained Regions," European Signal Processing Conference, pp. 1099-1103, Institute of Electrical and Electronics Engineers, New York, New York, (Aug. 27-31, 2012).
Lowe, "Object Recognition from Local Scale-Invariant Features," International Conference on Computing Vision, vol. 2, Institute of Electrical and Electronics Engineers, New York, New York, (Sep. 20-25, 1999).
Ren et al, "RGB-(D) Scene Labeling: Features and Algorithms," Conference on Computer Vision and Pattern Recognition, pp. 2759-2766, Institute of Electrical and Electronics Engineers, New York, New York (Jun. 16-21, 2012).
Sirmacek et al, "Urban-Area and Building Detection using SIFT Keypoints and Graph Theory," IEEE Transactions of Geoscience and Remote Sensing, vol. 47, Issue 4 pp. 1156-1167 Institute of Electrical and Electronics Engineers, New York, New York, (Apr. 2009).
Zhou et al, "3D Image Segmentation Based on Wavelet Transform Adaptive Threshold," Computer Applications and Software, vol. 23, Issue 10, pp. 20-22 (Oct. 2006).
Office Action in corresponding U.S. Appl. No. 14/766,738 (dated Jan. 17, 2017).
Bay et al., "SURF: Speeded Up Robust Features," Journal of Computer Vision and Image Understanding, Proceedings of European Conference on Computer Vision, pp. 404-417, Springer-Verlag, Berlin, Germany (2006).

* cited by examiner

METHOD AND APPARATUS FOR SEGMENTATION OF 3D IMAGE DATA

CROSS-REFERENCE TO RELATED APPLICATIONS

This application is a National Stage of International Application No. PCT/EP2012/075283, filed on Dec. 12, 2012, which is hereby incorporated by reference in its entirety.

TECHNICAL FIELD

The present invention relates to a method and an apparatus for segmentation of 3D image data. In particular, the present invention relates to a method and an apparatus for real time object segmentation in 3D image data based on local feature correspondences.

BACKGROUND

Presentation of 3D image content has been recently made available to consumers. It is expected that the amount of 3D equipment and video content increases rapidly within the next few years.

On the one hand, current 3D display technologies can recreate the effect of convergence, i.e. vertical rotation of both eyes in opposite directions to maintain binocular vision. On the other hand, other important depth cues, such as accommodation, for example a change of focus, cannot be faithfully reproduced as the resulting image is displayed on a flat surface. Thus, when displaying a close object on a distant screen, a strong positive disparity may result in an uncomfortable viewing experience. Video content which has been optimized for a standard cinema screen will look completely different on a TV screen or a handheld display device. Accordingly, image data and in particular the differences of depth values of the objects closest and furthest from the viewer have to be adapted to the special properties of the different applications in order to maintain high quality depth perception. This operation is denoted as content re-targeting or content re-mapping.

Content re-targeting generally refers to adjustment of an image or a video frame in order to adapt the content to the desired context. In the field of a 3D video content, content re-targeting performs an adjustment of the depth range related to a 3D video sequence to optimize perception according to terminal capabilities and viewing distance. The most straightforward way of adjusting the depth is to shift it linearly according to the available depth range. However, this may result in flattening objects in the scene. Alternatively, a non-linear depth adjustment may be performed. A non-linear depth adjustment may allow to apply shifts to the entire objects, for example in foreground. This may lead to a significant improvement of a 3D user experience. Further, non-linear depth adjustment provides more freedom in scene manipulation.

To perform non-linear depth adjustment, unique objects in the 3D scene have to be identified. In this way independent manipulation of the depth value of the individual objects may be performed in a re-targeting phase. For example, foreground objects can be moved to the image forefront. Background objects can be moved to the back. The depth ratios between different parts of the segmented objects may be still preserved.

However, conventional methods for re-targeting, in particular for segmentation of an image in a non-linear depth manipulation usually analyze the individual pixels of an image. Due to the large number of pixels in the images, these methods require huge computational resources.

As already mentioned, there is a steadily growing number of 3D devices. To adapt 3D video content to each of the individual devices, each device has to perform a re-targeting of the image data. However, small devices, such as mobile devices only provide limited computational capabilities.

Hence, there is a need for a method and an apparatus providing an efficient image segmentation of 3D image content.

There is also a need for an image segmentation of 3D image content which can be applied in real time on a 3D image device having the limited computational resources.

SUMMARY

According to a first aspect, a method for segmentation of 3D image data of a 3D image is provided. The 3D image comprises at least two views of the image, a first view of the image and a second view of the image. The method comprises determining local features of a first view of the 3D image; determining local features of a second view of the 3D image; determining local feature correspondences between the determined local features of the first view and the second view of the 3D image; and segmenting the 3D image data into a plurality of depth regions based on the determined local feature correspondences and a depth map of the 3D image.

By analyzing the local features correspondences, very reliable information relating to contiguous objects in a 3D image can be determined. In this way, a very efficient method for identifying objects in the image data allowing a real time segmentation of 3D image data is possible.

According to a first implementation form of the method according to the first aspect as such, the segmenting further comprises quantizing the depth map of the 3D image; and identifying the depth regions by determining contiguous depth map elements having a same quantized depth value.

According to a second implementation form of the method according to the first implementation form of the first aspect, the segmenting further comprises calculating a spatial displacement value of corresponding local features in the first and the second view, comparing the spatial displacement value with a predetermined displacement value, and eliminating wrong or erroneous local feature correspondences having a value of the spatial displacement larger than the predetermined displacement value.

In this way, outliers having a large spatial displacement value can be easily identified and eliminated in order to achieve a very reliable segmentation of the 3D image data.

According to a third implementation form of the method according to the second implementation form of the first aspect, the segmenting further comprises computing an average value of the spatial displacement or spatial displacement values within the depth region.

According to a fourth implementation form of the method according to the third implementation form of the first aspect, the segmenting further comprises calculating a correlation value of adjacent depth regions; and merging the adjacent depth regions if the calculated correlation value is larger than a predetermined threshold value.

By merging adjacent depth regions having a high correlation value, an efficient combination of depth regions referring to the same object can be achieved.

According to a fifth implementation form of the method according to the third or the fourth implementation form of the first aspect, the segmenting further comprises generating a graph having vertexes corresponding to the determined local features; and applying a graph cut process to the generated graph to obtain auxiliary image segmentation; wherein the adjacent depth regions are merged using the obtained auxiliary image segmentation.

By applying such a graph cut process based on the local features, very helpful additional information for segmentation can be obtained.

According to a sixth implementation form of the method according to the fourth or the fifth implementation forms of the first aspect, the segmenting further comprises identifying an edge within a depth region of the plurality of the depth regions; and segmenting the depth region into at least two depth regions according to the identified edge.

Segmenting one depth region into at least two depth regions enables neighbouring objects within one depth region to be identified as separate objects.

According to a seventh implementation form of the method according to the first aspect as such or according to any of the preceding implementation forms of the first aspect, the segmenting further comprises segmenting the 3D image data into foreground image data and background image data, wherein the segmentation is performed only for the foreground image data.

By skipping the background image data, the segmentation can be further simplified and consequently the computational load is further reduced.

According to an eighth implementation form of the method according to the first aspect as such or according to any of the preceding implementation forms of the first aspect, the image data are obtained from a video sequence.

By performing image segmentation on the image data of a video sequence, a very efficient re-targeting and processing in accordance with a connected display device can be achieved in real time. In this way, a very reliable and efficient segmentation of 3D image data is provided.

According to a ninth implementation form of the method according to the first aspect as such or according to any of the preceding implementation forms of the first aspect, the local feature correspondences are determined by a matching process comparing the determined local features of the first view and the second view of the 3D image.

By such a matching process of local feature correspondences, corresponding local features can be easily identified.

According to an tenth implementation form of the method according to the first aspect as such or according to any of the preceding implementation forms of the first aspect, wherein the value of the spatial displacement is determined with respect to a single spatial direction.

According to another implementation form of the method according to the first aspect as such or according to any of the preceding implementation forms of the first aspect, the image data comprises more than two views of the image, for instance, three, four or more views. Each view relates to a single image of a scene and is captured from a different perspective. When the 3D image comprises more than two views, the step of determining local features may be performed for each of the more than two views, the step of determining local features correspondences may be performed between the more than two views accordingly. Furthermore the matching process may be performed by comparing the determined local features of the more than two views.

According to second aspect, an apparatus for segmentation of 3D image data of a 3D image is provided. The 3D image segmentation apparatus comprises local feature determining means configured for determining local features of a first view of the 3D image, and for determining local features of a second view of the 3D image; correspondences determining means configured for determining local feature correspondences between the local features of the first view and the second view of the 3D image; and segmenting means configured for segmenting the 3D image data into a plurality of depth regions based on the determined local feature correspondences and a depth map of the 3D image.

According to a possible implementation form of the apparatus according to the second aspect as such, the 3D image data comprises more than two views of the image, for instance, three, four or more views. Each view relates to a single image of a scene and is captured from a different perspective. When the image data comprises more than two views, the corresponding means are adapted to process the more than two views accordingly. For instance, the local feature determining means may be configured for determining local features of each of the more than two views, the correspondences determining means may be configured for determining local features correspondences between the more than two views accordingly.

According to another implementation form of the apparatus according to the second aspect as such or according to any of the preceding implementation forms of the second aspect, the segmentation means may further comprise sub-means for performing the steps according to any of the first to tenth implementation forms of the first aspect.

According to a third aspect, an apparatus for performing segmentation of 3D image data of a 3D image comprises a processor configured to perform the method according to the first aspect or according to any of the implementation forms of the first aspect. The apparatus may further comprise a receiver configured to receive the 3D image data, to determine the at least two views of the image, and to determine a depth map 110 of the 3D image data. The receiver may further be configured for receiving the depth map 110.

The apparatus according to the second or the third aspect as such or according to the any of the preceding implementation forms of the second or third aspect may further comprise a 3D image data source to provide the 3D image data.

According to a forth aspect, the invention can be implemented in digital electronic circuitry, or in computer hardware, firmware, computer software, or in combinations thereof. The computer software comprises a program code for performing the method according to the first aspect as such or according any of the preceding implementation forms of the first aspect.

An idea underlying the present invention is to perform the image segmentation based on local features of the image data. A local feature is a compact description of a patch surrounding a point of an image. Usually the number of local features in an image is much lower than the number of pixels. Thus, a segmentation based on local features can be performed much faster and with less computational resources than image segmentation based on each individual pixel of an image.

These and other aspects of the invention will be apparent from the embodiment(s) described below.

BRIEF DESCRIPTION OF DRAWINGS

In the following, embodiments of the invention will be described, by way of example only, with reference to the accompanying drawings in which.

DESCRIPTION OF EMBODIMENTS

Figure 1:
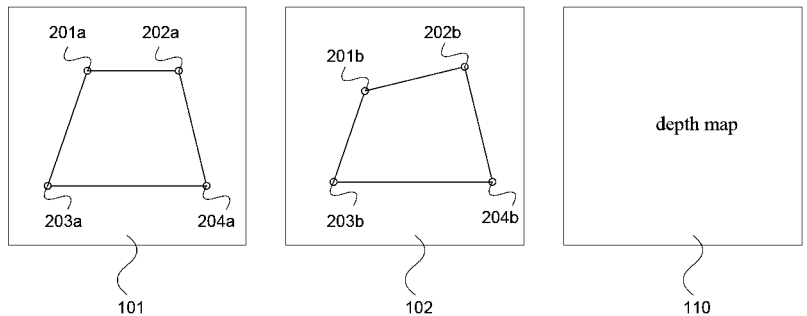
FIG. 1 schematically illustrates a set of image data as used by an embodiment of the method according to the present invention.

In the following, terms for describing a direction like "above", "below", "left", "right" and so on are only for a better understanding of the figures and do not limit the present invention. Same reference numerals relate to same components. The dimensions of the figures are only for illustration purposes and do not limit the invention in any way.

3D image data as used by the method according to the present invention relates to all image data which can be used for generating a 3D representation of an image. 3D image data may relate to an individual image, a single image within a sequence of images or a plurality of successive images within a video sequence. Image data may be provided either in an uncompressed format or may be compressed according to any compression standard. If the image data are provided in a compressed format, the data may be decompressed before segmentation according to the present invention is performed.

FIG. 1 illustrates an exemplary set of 3D image data. The image data comprises at least a first view 101 of the 3D image and a second view 102 of the 3D image. For example, the first view 101 may relate to image data for a left eye, and the view 102 may relate to image data for a right eye. Although the present invention is described with respect to only two views of an 3D image, it is also possible to adapt the present invention to 3D image data comprising more than two views, for instance three, four, or more views.

In addition to the plurality of views 101 and 102, the 3D image or 3D image data may further comprise a depth map 110. The depth map 110 can be obtained or determined directly by receiving it from an external device, for instance from a range camera such as a time of flight camera. Alternatively, the depth map 110 can be obtained or determined by computing. For example, the depth map 110 can be computed from the 3D image data.

Figure 2:
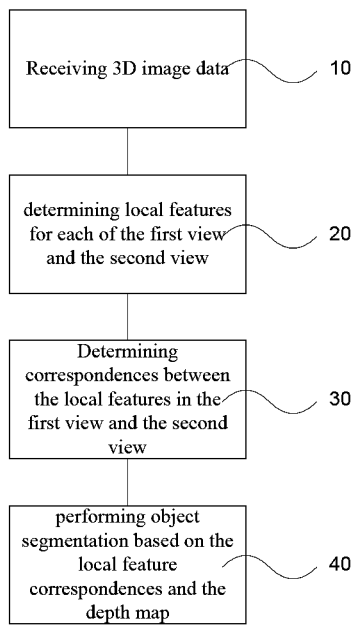
FIG. 2 schematically illustrates a flow diagram of a method for segmentation of 3D image data according to an embodiment of the invention.

FIG. 2 shows a flowchart illustrating a segmentation method according to an embodiment of the present invention. In a first step 10, 3D image data are received. The 3D image data comprise at least two views, this embodiment takes two views as an example, a first view 101 and a second view 102. The first view 101 and the second view 102 of the image data, and a depth map 110 may be determined. The image data can be provided from a camera, a camera system or the data can be received from a memory storing 3D image data or from a transmission interface providing 3D image data. Alternative 3D image data sources for providing 3D image data are also possible.

The depth map 110 may be obtained or determined, for example, by computing in an additional sub-step based on the received 3D image data. Alternatively, it is also possible to obtain or determine the depth map 110 by receiving an already existing depth map 110. For example, the depth map 110 can be computed in advance or the depth map can be provided from a range camera as already described above.

In a further step 20, local features are determined for each of the first view 101 and the second view 102. Local features in computer vision usually are used, for instance, for object identification or image registration. Usually, local features are invariant to a rotation, illumination and perspective distortions.

In order to determine the local features in step 20, any of the already known methods for determining local features can be used. For instance, the local features may be determined based on the Scale-Invariant Feature Transforms algorithm (SIFT) or the Speeded Up Robust Features algorithm (SURF). Other algorithms or modifications of the above-described algorithms for determining the local features are also possible.

A local feature is a compact description of a patch surrounding a point of an image. To compute a local feature, a main orientation of a point is computed based on the main gradient component in the environment of the point. Starting from this orientation, a surrounding path oriented towards the main orientation is extracted. After this, the patch is subdivided into a rectangular or radial grid. For each element of the grid, a histogram of the local gradients is computed. Histograms computed on the grid elements represent the components of the local feature.

Normally, local features are computed for the key points of a scene. In particular, these key points all relate to peculiar elements of this scene, for instance corners, specific patterns, etc. To improve the segmentation of 3D image data, local features providing a good description of a surrounding texture region may be preferred. For this purpose, SIFT or SURF descriptors, for example Kanade-Lucas-Tomasi (KLT) features, centres of gravity of the depth regions or even random points may be used. However, corners or edge detectors might be less suited, since they tend to identify points which normally occupy the border of a texture region in a correct segmentation.

Referring to FIG. 1, four local features 201a, 202a, 203a and 204a are indicated in the first view 101. The second view 102 also comprises four local features, namely 201b, 202b, 203b and 204b.

After the determination of the local features in the individual image views 101 and 102 has been completed, in step 30 correspondences between the local features in the first view 101 and the second view 102 are determined. In this way, corresponding local features in the individual views are identified. As can be seen in FIG. 1, corresponding local features are not exactly located at the same position in the individual views. For instance, local feature 201a is located in a position closer to the left border with respect to the corresponding local feature 201b in the second view 102. In the same way, there is also displacement between the further local features 202a, 203a and 204a compared to the local features 202b, 203b and 204b of the second view 102.

In order to determine local feature correspondences between the first view 101 and the second view 102, a matching operation may be performed. For this purpose, local features of the individual views are taken into account in order to identify the local feature in the first and the second view having the same or at least very similar properties.

Next, in step 40 object segmentation is performed based on the local feature correspondences and the depth map 110. The 3D image data is segmented into a plurality of depth regions based on the determined local feature correspondences and the depth map. An embodiment of the image segmentation process is shown in more detail in FIG. 3.

The depth map 110 may be represented as a bi-dimensional matrix, composed by a number of depth map elements. Each depth map element may represent a pixel or a plurality of pixels.

In step 41, the depth map 110 is quantized, or in other words, the depth values of the depth map elements are quantized.

By this quantization, the range of values assumed by the depth map elements in the depth map 110 is divided into a predetermined number of sub-ranges. All values assumed by the depth map elements within a same sub-range are assigned to a common quantized depth value.

Next, adjacent depth map elements having the same quantized depth value are combined in order to define or identify a depth region. These identified depth regions are used as starting point for the following segmentation procedure. In order to limit the number of depth regions and to correct inconsistencies, for example irregularities at the border of a depth region, small depth regions may be merged to an adjacent depth region, as follows: distances between the quantized depth value of the small depth region and all the quantized depth values of the adjacent depth regions are computed, respectively, and the small depth region may be merged to the one with the minimum distance. The process may be iterated until all the depth regions are bigger than a predetermined threshold.

In step 42 incorrect local feature correspondences, also referred to as wrong or erroneous local feature correspondences, are eliminated. For this purpose, a spatial displacement between corresponding local features in the individual views is calculated. Correspondences between local features having a large spatial displacement are eliminated. For example, correspondences with a spatial displacement being more than a predetermined displacement value, such as 3$\sigma$, may be pruned out, where $\sigma$ represents the standard deviation of the histogram of spatial displacements of the correspondences identified between the first view 101 and the second view 102.

Normally, spatial displacements of correct matchings are very small. Further to this, correct spatial displacements are only mono-directional shifted along a single direction, preferably in x-dimension. In contrast to this, wrong correspondences may be randomly distributed across the whole image, wherein the spatial displacement is substantially higher than the average distance.

The performing of the steps 41 and 42 does not have any time sequence requirement. They may be performed in parallel, or one after the other.

In step 43, an average spatial displacement of corresponding local features within a depth region is computed. For this purpose, only displacements in x dimension are considered. Displacements in y dimension are considered to be only noisy, and thus displacement values in y dimension are ignored.

In step 44, a correlation value between two adjacent depth regions is computed and correlated adjacent depth regions may be merged. For instance, if the computed correlation value is larger than a predetermined threshold value, two depth regions are merged to a single depth region. Otherwise, the two depth regions are considered to be separate.

After the average distance of corresponding local features has been computed, a correlation value corr between two adjacent depth regions is calculated in step 44 as follows:

$$\text{corr} = 1 - \left( \alpha \frac{\text{abs}(D1 - D2)}{\text{depthRange}} + (1 - \alpha) \frac{\text{abs}(md1 - md2)}{\text{distRange}} \right) / 2$$

In this formula $\alpha$ is a configurable weight parameter, D1 and D2 are the depth values of the two depth regions in the first and the second view, and md1 and md2 are the computed average distances between the corresponding depth regions in the first and the second view. depthRange represents the full range of the quantized depth values and distRange indicates the full range of the average spatial displacement values, respectively. Based on this formula, two factors are taken into account, namely the quantized depth value and the spatial displacement of corresponding depth regions.

If the computed correlation value is larger than a predetermined threshold value, two depth regions are merged to a single depth region. Otherwise, the two depth regions are considered to be separate. In this way, it is possible to identify large objects as whole even when the object comprises a plurality of sub-segments having different depth values.

In order to further improve the segmentation of step 44, additional information may be taken into account for calculating a correlation value between adjacent depth regions. For example, it is possible to determine a graph with a vertex for each local feature of a view. Adjacent vertexes may be linked together by edges. The edges of the graph may specify an edge weight based on the norm of a colour difference between connected vertexes or any other criteria. Based on such a sparse graph, a graph cut algorithm may be applied in order to obtain an auxiliary image segmentation. This auxiliary image segmentation may be used additionally for computing the correlation value according to the following formula:

$$\text{corr} = 1 - \left( \alpha \frac{\text{abs}(D1 - D2)}{\text{depthRange}} + (1 - \alpha) \frac{\text{abs}(md1 - md2)}{\text{distRange}} \right) / 2 - \sigma \times b$$

wherein $\sigma$ is a weight factor and b is a binary operator according to the above-described graph cut analysis. The value of b has the following value: +1 if the observed depth region is considered to relate to the same object or −1 otherwise.

Based on this alternative correlation value a combination of adjacent depth regions can be applied as described above.

Optionally, in order to improve the segmentation of the image data, in step 45 an identification of edges is performed. The result of this edge detection or edge identification process in step 45 is used in order to adapt the image segmentation to the detected edges. Any known edge detection technique may be applied to this step.

If an edge is identified, that extends through the whole depth region, and thus entirely segments a depth region into at least two depth sub-regions, the respective depth region is divided into at least two individual depth regions.

Optionally, in order to further accelerate the identification of edges in step 45, the image data can be segmented into foreground image data relating to a foreground and background image data relating to the background. Usually no image segmentation for the background image data relating to the background is required for re-targeting. Thus, image segmentation further can speed up by skipping background data and only considering the foreground image data.

Figure 6:
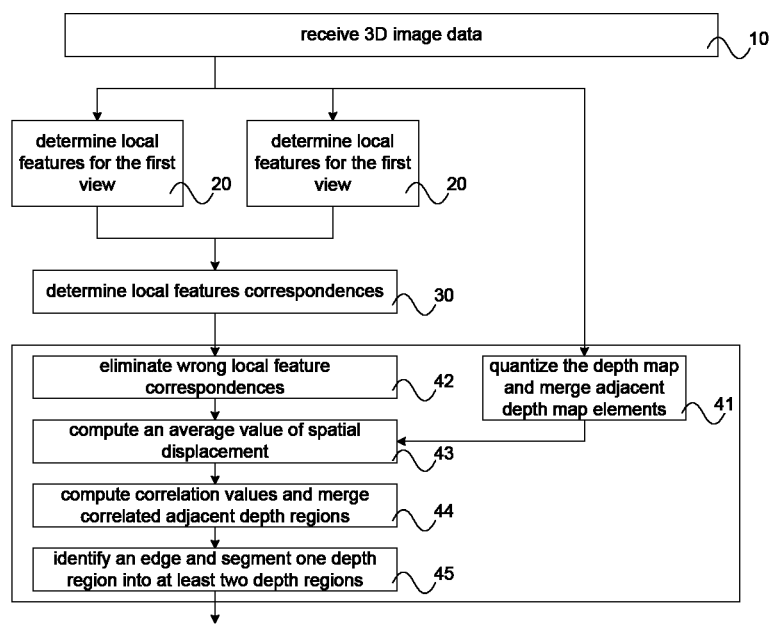
FIG. 6 schematically illustrates a flow diagram of a method for segmentation of 3D image data according to an embodiment of the invention.

FIG. 6 illustrates a flow diagram of a method for segmentation of 3D image data according to an embodiment of the invention, which comprises all steps according to the preceding method embodiment of the present invention.

Figure 7:
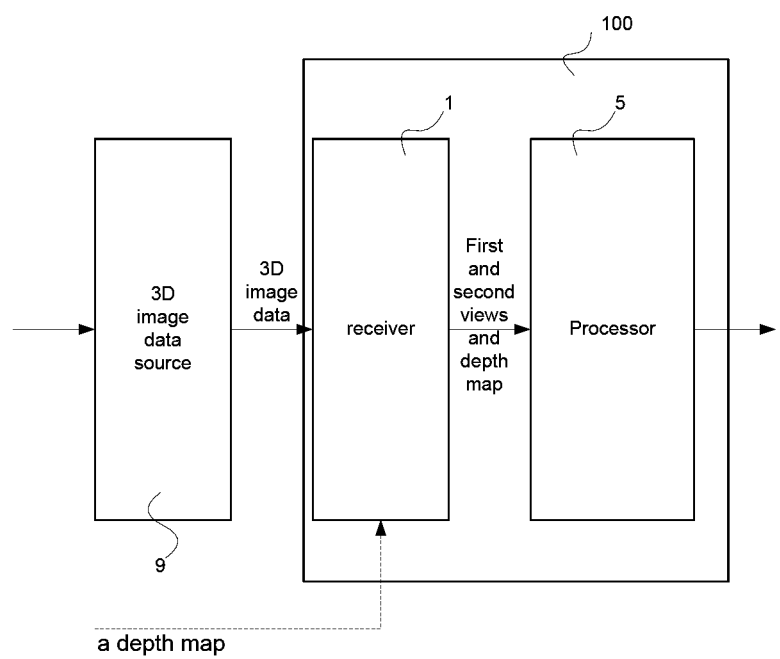
FIG. 7 schematically illustrates a 3D image segmentation apparatus according to another embodiment of the invention.

According to another embodiment, as shown in FIG. 7, an apparatus 100 for segmentation of 3D image data is provided. The apparatus 100 may comprise a processor 5 configured to perform the steps according to any of the preceding method embodiments of the present invention. The apparatus 100 may further comprise a receiver 1 configured to receive the 3D image data, to determine the at least two views of the image, and to determine or obtain the depth map 110 of the 3D image. The receiver 1 may receive the 3D image data from a 3D image data source 9, such as a camera or a camera system, a transmission line or a 3D image data memory or any other source providing 3D image data. The receiver may be configured to determine the depth map 110 by computing based on the received 3D image data, or by receiving the depth map 110 from an external device. When the depth map is determined by receiving from an external device the receiver 1 may be further configured for receiving the depth map 110. Alternatively, the apparatus 100 may further comprise an independent receiver configured for receiving the depth map 110.

According to another embodiment, an alternative apparatus 100 for segmentation of 3D image data is provided. This apparatus 100 may comprise means for performing each step of the preceding method embodiment of the present invention.

Figure 4:
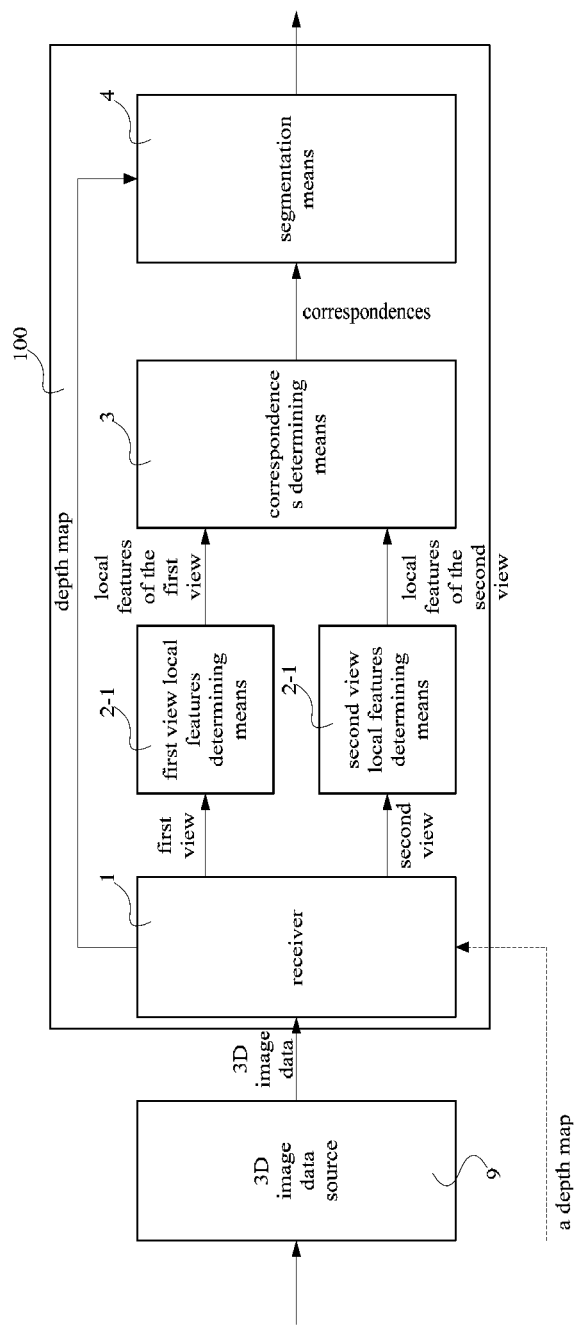
FIG. 4 schematically illustrates a 3D image segmentation apparatus according to an embodiment of the invention.
Figure 5:
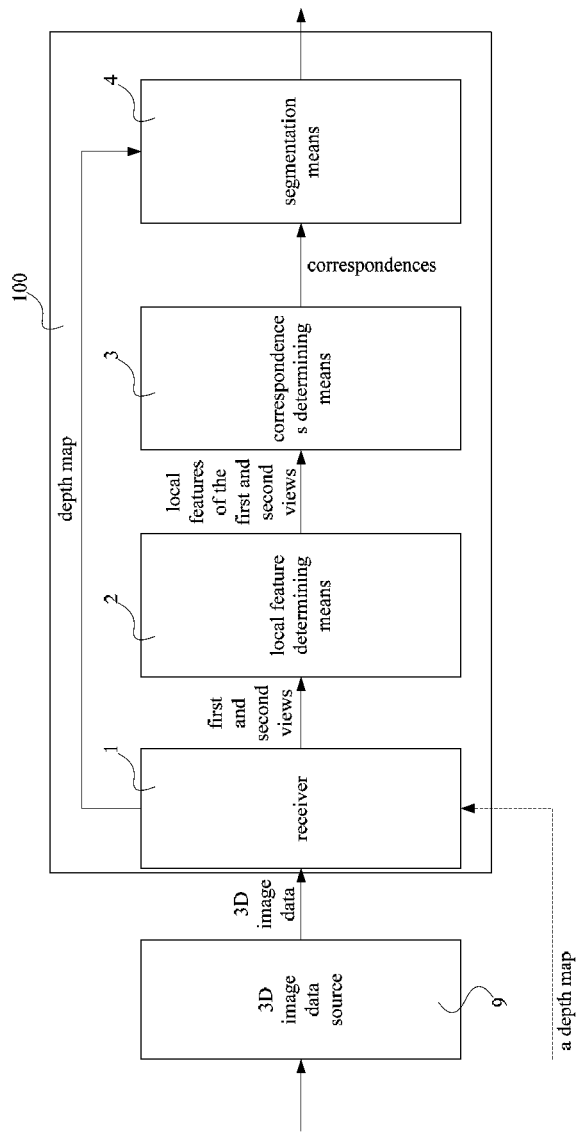
FIG. 5 schematically illustrates a 3D image segmentation apparatus according to another embodiment of the invention.

For instance, FIG. 4 illustrates an apparatus 100 for segmentation of 3D image data according to the preceding method embodiment of the present invention. The 3D image data comprise at least two views, this embodiment takes two views as an example, a first view 101 and a second view 102. The apparatus 100 comprises a local feature determining means 2. The local feature determining means 2 determines the local features of the first and the second view 101 and 102 as already described above. Alternatively, as shown in FIG. 5 the determining means 2 may be in the form of two independent means, a first view local feature determining means 2-1 adapted to determine the local features of the first view 101 and a second view local feature determining means 2-2 adapted to determine the local features of the second view 102. The first and the second view 101, 102 of the image are provided to the first and the second view local feature determining means 2-1, 2-2, respectively.

Based on the local features determined by the local feature determining means 2, or the first view local feature determining means 2-1 and the second view local feature determining means 2-2, correspondences between the local features of the individual views 101 and 102 are determined by correspondences determining means 3. For this purpose, a matching operation between the local features 201a, 202a, 203a and 204a determined in the first view 101 and the local features 201b, 202b, 203b and 204b determined in the second view 102 can be performed.

Finally, segmentation means 4 computes an image segmentation of the 3D image data based on the depth map 110 and the local feature correspondences. The depth map 110 may be provided by the receiver 1. The local feature correspondences may be provided by the correspondences determining means 3. This image segmentation is performed as described before. As a result, a plurality of depth regions is computed or determined based on the determined local feature correspondences and the depth map.

Figure 3:
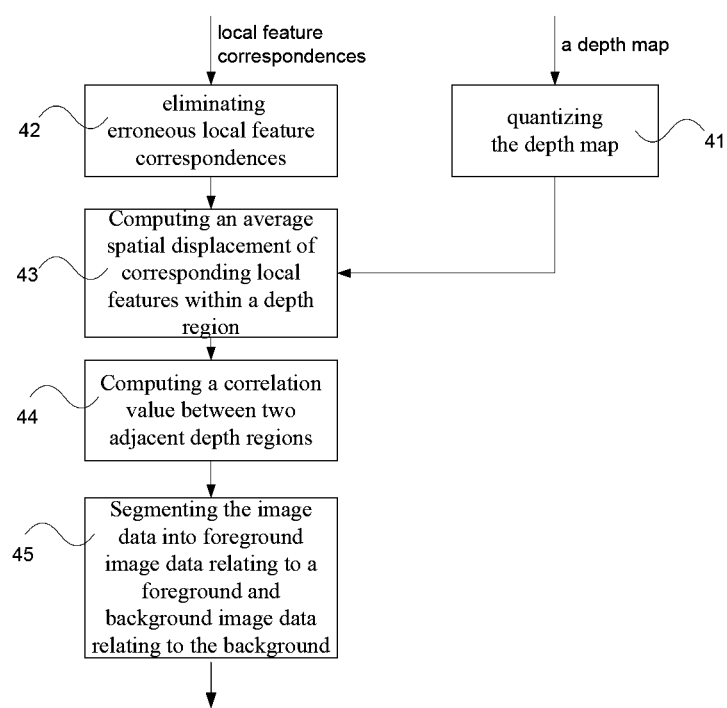
FIG. 3 schematically illustrates the flow diagram for segmenting 3D image data into a plurality of depth regions according to an embodiment of the invention.

Optionally, the segmentation means 4 may further comprise sub-means for performing the corresponding steps 41-45 of the method embodiments of the present invention as described, for example, based on FIGS. 3 and 6.

The apparatus 100 as shown in FIGS. 4 and 5 may further comprise a receiver 1 for receiving 3D image data, determining the first view 101 and the second view 102 of the image, and determining a depth map 110 of the image. In order to receive the image data, the receiver 1 may be connected directly to a 3D image data source 9, such as a camera or a camera system. Alternatively, the receiver 1 may also receive the image data from a 3D image data source 9, such as a wireless or wire-line transmission interface, a 3D image data memory or any other source providing 3D image data.

The receiver 1 is configured for determining the depth map 110 by computing based on received 3D image data or by receiving a depth map 110 from an external device.

The receiver 1 may comprise sub-means for determining the depth map 110 and the at least two views 101 and 102, respectively. The means for determining the depth map 110 may comprise means for computing the depth map 110 based on the received 3D image data, and/or means for receiving the depth map 110 from an external device. The external device may obtain the 3D image data from the 3D image data source 9 and compute the depth map 110 based on the 3D image data.

When the depth map 110 is obtained from an external device, the depth map 110 being received by the receiver 1 is shown in FIGS. 4 and 5 as an example. Alternatively, the segmentation apparatus 100 may further comprise independent means for receiving the depth map 110 and providing the received depth map 110 to the segmentation means 4. Thereby the means of the receiver 1 configured for receiving the depth map 110 are not needed accordingly.

Optionally, the apparatus 100 may further comprise other means for performing any of the preceding method embodiments of the present invention.

The 3D image data source 9 as shown in FIGS. 4-5 and 7 may be an external source with respect to the apparatus 100 as shown in FIGS. 4-5 and 7, alternatively, the 3D image data source 9 may be a part of the apparatus 100 as shown in FIGS. 4 to 5 and 7 as well.

Summarizing, the present invention provides a method and an apparatus for real time object segmentation of 3D image data based on local feature correspondences between a plurality of views of the 3D image. In order to reduce the computational effort of object segmentation of 3D image data, the segmentation process is performed based on correspondences relating to local features of the image data. In this way, computational effort can be significantly reduced and the image segmentation is carried out very fast.

What is claimed is:

1. A method for generating a depth-based segmentation of a three dimensional (3D) image data of a 3D image, the method comprising:
   determining a first set of local features within a first image data for a first view of the 3D image;
   determining a second set of local features within a second image data for a second view of the 3D image;
   determining a set of corresponding local features between the first set of local features of the first image data and the second set of local features of the second image data of the 3D image data; and segmenting each of the first image data and the second image data into a plurality of corresponding depth regions of the first image data and second image data for the 3D image based on:
 the set of corresponding local features within corresponding depth regions of the first image data and the second image data, and
 a depth map of the 3D image,
wherein the depth map is made up of depth map elements defined by an image position and a depth value,
wherein each local feature describes a patch of the 3D image surrounding a point within the 3D image, and
wherein the segmenting comprises:
 identifying a set of initial depth regions, wherein each initial depth region is:
  a group of contiguous depth map elements, and
  formed from the depth map based upon the depth values assigned to individual ones of the depth map elements;
 computing, for pairs of corresponding initial depth regions in the first image data and the second image data, an average spatial displacement of corresponding local features within a pair of corresponding initial depth regions; and
 merging adjacent ones of the set of initial depth regions based on similarity between the adjacent ones of the initial depth regions as measured by a correlation value for the adjacent ones of the initial depth regions,
  wherein the correlation value is based upon both:
   respective depth values assigned to the adjacent ones of the initial depth regions, and
   respective average spatial displacement of corresponding local features within the pair of corresponding initial depth regions, computed during the computing, for the adjacent ones of the initial depth regions.

2. The method according to claim 1, wherein the segmenting comprises quantizing the depth value of the depth map elements of the depth map of the 3D image; and
 wherein the identifying a set of initial depth regions comprises identifying the initial depth regions by determining contiguous depth map elements having a same quantized depth value.

3. The method according to claim 1, wherein the segmenting further comprises:
 eliminating erroneous local feature correspondences having a value of the spatial displacement larger than the predetermined displacement value.

4. The method according to claim 1, wherein the segmenting further comprises:
 generating a graph having vertexes corresponding to the determined local features; and
 applying a graph cut process to the generated graph to obtain auxiliary image segmentation;
 wherein the adjacent depth regions are merged using the obtained auxiliary image segmentation.

5. The method according to claim 1, the segmenting further comprising:
 identifying an edge extending through a depth region of the plurality of corresponding depth regions; and
 segmenting the depth region into at least two depth regions according to the identified edge.

6. The method according to claim 1, the segmenting further comprising segmenting the 3D image data into foreground image data and background image data, wherein the segmentation is performed only for the foreground image data.

7. The method according to claim 1, wherein the 3D image data are obtained from a video sequence.

8. The method according to claim 1, wherein the local feature correspondences are determined by a matching process comparing the determined local features of the first view and the second view of the 3D image.

9. The method according claim 1, wherein the value of the spatial displacement of corresponding local features is determined with respect to a single spatial direction.

10. An apparatus for generating a depth-based segmentation of a three dimensional (3D) image data of a 3D image, the apparatus comprising:
 a receiver;
 a processor; and
 a non-transitory computer-readable medium including computer-executable instructions,
 wherein the receiver is configured to receive 3D image data from a 3D image data source,
 wherein the 3D image data comprises a first image data for a first view and a second image data for a second view, and
 wherein the processor is configured to execute the computer-executable instructions on the non-transitory computer-readable medium to carry out generating the depth-based segmentation of the 3D image data according to a method comprising:
  determining a first set of local features within a first image data for a first view of the 3D image;
  determining a second set of local features within a second image data for a second view of the 3D image;
  determining a set of corresponding local features between the first set of local features of the first image data and the second set of local features of the second image data of the 3D image data; and
  segmenting each of the first image data and the second image data into a plurality of corresponding depth regions of the first image data and second image data for the 3D image based on:
   the set of corresponding local features within corresponding depth regions of the first image data and the second image data, and
   a depth map of the 3D image,
  wherein the depth map is made up of depth map elements defined by an image position and a depth value,
  wherein each local feature describes a patch of the 3D image surrounding a point within the 3D image, and
  wherein the segmenting comprises:
   identifying a set of initial depth regions, wherein each initial depth region is:
    a group of contiguous depth map elements, and
    formed from the depth map based upon the depth values assigned to individual ones of the depth map elements;
   computing, for pairs of corresponding initial depth regions in the first image data and the second image data, an average spatial displacement of corresponding local features within a pair of corresponding initial depth regions; and
   merging adjacent ones of the set of initial depth regions based on similarity between the adjacent ones of the initial depth regions as measured by a correlation value for the adjacent ones of the initial depth regions, wherein the correlation value is based upon both:
respective depth values assigned to the adjacent ones of the initial depth regions, and
respective average spatial displacement of corresponding local features within the pair of corresponding initial depth regions, computed during the computing, for the adjacent ones of the initial depth regions.

11. The apparatus according to claim 10, wherein the segmenting comprises quantizing the depth value of the depth map elements of the depth map of the 3D image; and
wherein the identifying a set of initial depth regions comprises identifying the initial depth regions by determining contiguous depth map elements having a same quantized depth value.

12. The apparatus according to claim 11, wherein the segmenting further comprises:
eliminating erroneous local feature correspondences having a value of the spatial displacement larger than the predetermined displacement value.

13. The apparatus according to claim 10, wherein the segmenting further comprises:

generating a graph having vertexes corresponding to the determined local features; and
applying a graph cut process to the generated graph to obtain auxiliary image segmentation;
wherein the adjacent depth regions are merged using the obtained auxiliary image segmentation.

14. The apparatus according to claim 10, wherein the segmenting further comprises:
identifying an edge extending through a depth region of the plurality of corresponding depth regions; and segment the depth region into at least two depth regions according to the identified edge.

15. The apparatus according to claim 10, wherein the segmenting comprises segmenting the 3D image data into foreground image data and background image data, wherein the segmentation is performed only for the foreground image data.

16. The apparatus of claim 10 wherein each depth map element corresponds to a group of adjacent pixels of the 3D image.

17. The method of claim 1 wherein each depth map element corresponds to a group of adjacent pixels of the 3D image.

* * * * *